(12) United States Patent
Choi

(10) Patent No.: US 11,742,675 B2
(45) Date of Patent: Aug. 29, 2023

(54) METHOD OF CONTROLLING CHARGING AND DISCHARGING OF POWER STATION EQUIPPED WITH MULTIPLE BATTERY PACKS

(71) Applicant: ENERCAMP Co., Ltd., Daegu-si (KR)

(72) Inventor: Jung Sub Choi, Daegu-si (KR)

(\*) Notice: Subject to any disclaimer, the term of this patent is extended or adjusted under 35 U.S.C. 154(b) by 122 days.

(21) Appl. No.: 17/404,521

(22) Filed: Aug. 17, 2021

(65) Prior Publication Data

US 2022/0158459 A1 May 19, 2022

(30) Foreign Application Priority Data

Nov. 13, 2020 (KR) .................... 10-2020-0152153

(51) Int. Cl.
*H02J 7/00* (2006.01)
*H02J 3/38* (2006.01)
(Continued)

(52) U.S. Cl.
CPC .......... *H02J 7/0013* (2013.01); *H02J 3/381* (2013.01); *H02J 3/46* (2013.01); *H02J 7/0045* (2013.01);
(Continued)

(58) Field of Classification Search
CPC .. H02J 7/0013; H02J 7/0048; H02J 7/007182; H02J 3/381; H02J 3/46;
(Continued)

(56) References Cited

U.S. PATENT DOCUMENTS

2009/0085553 A1 4/2009 Kumar et al.
2013/0057076 A1 3/2013 Lavender
(Continued)

FOREIGN PATENT DOCUMENTS

EP 3651308 A1 5/2020
JP 2013-501488 A 1/2013
(Continued)

OTHER PUBLICATIONS

English Specification of JP2013-501488A.
(Continued)

*Primary Examiner* — Rexford N Barnie
*Assistant Examiner* — Swarna N Chowdhuri
(74) *Attorney, Agent, or Firm* — ANTONIO HA & U.S. PATENT, LLC

(57) ABSTRACT

A method of controlling charging and discharging of a power station equipped with multiple battery packs, performed by a power station including N (N is a natural number equal to or greater than 2) battery packs mounted to be electrically charged/discharged and including a main controller controlling the charging/discharging, includes charging, by the main controller, the N battery packs in a determined charge order by controlling N input relay units connecting the N battery packs to an external charge source, and when a load is connected from the outside during the charging operation, calculating, by the main controller, an amount of electricity required by the load, controlling N output relay units connecting the N battery packs to the load to connect battery packs by the number corresponding to the calculated amount of electricity to the load and perform a discharging operation, wherein the charging operation and the discharging operation are performed simultaneously.

14 Claims, 10 Drawing Sheets

(51) Int. Cl.
*H02J 3/46* (2006.01)
*H02J 7/04* (2006.01)
*B60L 53/60* (2019.01)

(52) U.S. Cl.
CPC .......... *H02J 7/0048* (2020.01); *H02J 7/0063* (2013.01); *H02J 7/007182* (2020.01); *H02J 7/04* (2013.01); *B60L 53/60* (2019.02); *H02J 2300/22* (2020.01)

(58) Field of Classification Search
CPC .......... H02J 7/0045; H02J 7/0063; H02J 7/04; H02J 7/0025; H01M 10/42
USPC .......................................................... 307/29
See application file for complete search history.

(56) References Cited

U.S. PATENT DOCUMENTS

| | | | |
|---|---|---|---|
| 2015/0015075 A1 | 1/2015 | Toya et al. | |
| 2015/0145349 A1* | 5/2015 | Bausch | H01H 9/30 307/135 |
| 2016/0099590 A1 | 4/2016 | Matthew et al. | |
| 2020/0300938 A1* | 9/2020 | Schmitt | G11C 13/004 |
| 2020/0395771 A1* | 12/2020 | Hiratsuka | H02J 7/0029 |
| 2021/0305838 A1* | 9/2021 | Stellnert | H02J 7/007192 |

FOREIGN PATENT DOCUMENTS

| | | |
|---|---|---|
| JP | 2016-208692 A | 12/2016 |
| JP | 2019-017201 A | 1/2019 |
| KR | 20-2012-0006321 | 1/2012 |
| KR | 10-2019-0114855 | 10/2019 |
| KR | 10-2020-0032293 | 3/2020 |
| KR | 10-2020-0048913 | 5/2020 |
| KR | 10-2020-0116575 | 10/2020 |
| WO | WO1999056376 | 11/1999 |

OTHER PUBLICATIONS

English Specification of 10-2020-0032293.
English Specification of 10-2020-0048913.
English Specification of 20-2012-0006321.
English Specification of 10-2020-0116575.
English Specification of 10-2019-0114855.
English Specification of JP2019-017201A.
English Specification of JP2016-208692A.
English Specification of WO1999056376.

* cited by examiner

METHOD OF CONTROLLING CHARGING AND DISCHARGING OF POWER STATION EQUIPPED WITH MULTIPLE BATTERY PACKS

CROSS-REFERENCE TO RELATED APPLICATION(S)

This application claims priority to Korean patent application No. 10-2020-0152153, filed in the Korean intellectual property office on Nov. 13, 2020, the disclosure of which is incorporated by reference herein in its entirety.

TECHNICAL FIELD

The present disclosure relates to a method of controlling charging and discharging of a power station equipped with multiple battery packs, and more particularly, to a method of controlling charging and discharging of a power station equipped with multiple battery packs to simultaneously perform charging and discharging by distinguishing between a battery pack to be charged and a battery pack to be discharged by connecting a plurality of battery packs in a relay manner and to separately use some of the battery packs detachably provided in the power station.

DESCRIPTION OF RELATED ART

With the recent development of battery technologies, batteries have been used in various electric or mechanical devices. Batteries have been used in a wide range of fields from small electronic devices such as smartphones to large electric devices such as energy storage systems (ESS).

Meanwhile, batteries may be recharged and used when charged power is completely used. However, as a charging capacity of the batteries increases, a charging time increases. Recently, in order to solve this problem, a power station technology that allows a fully charged battery to be exchanged and used has been provided.

The power station charges a plurality of batteries at all times and separately provides the batteries to users who need them, so that users does not need to directly charge the batteries, thus significantly reducing a time required for charging the batteries. In addition, a load may be directly connected to the power station to supply power to the external load. For example, the power station may be installed in a home or factory and used as emergency power to prepare for a case in which commercial power is cut off. However, there is a problem in that charging cannot be performed at the same time when a load is connected to the power station and the battery is being discharged. This is because most of the batteries mounted in the power station are based on lithium batteries, simultaneous charging and discharging involves a risk of explosion. Therefore, there is a need to provide a power station capable of performing charging, while supplying power to a load.

SUMMARY

An aspect of the present disclosure may provide a method of controlling charging and discharging of a power station equipped with multiple battery packs, in which a power station including a plurality of battery packs stably perform charging and discharging simultaneously by discriminating between a battery pack to be charged and a battery pack to be discharged.

An aspect of the present disclosure may also provide a method of controlling charging and discharging of a power station equipped with multiple battery packs, in which a plurality of battery packs are detachably provided so that a user separately uses the battery packs and power may be supplied to a load having a large capacity by connecting the battery packs in parallel to each other.

The problems of the present disclosure are not limited to the technical problems mentioned above, and other technical problems not mentioned herein will be clearly understood by those skilled in the art from the following description.

In an aspect, a method of controlling charging and discharging of a power station equipped with multiple battery packs, performed by a power station including N (N is a natural number equal to or greater than 2) battery packs mounted to be electrically charged/discharged and including a main controller controlling the charging/discharging, includes: charging, by the main controller, the N battery packs in a determined charge order by controlling N input relay units connecting the N battery packs to an external charge source; and when a load is connected from the outside during the charging operation, calculating, by the main controller, an amount of electricity required by the load and controlling N output relay units connecting the N battery packs to the load to connect battery packs by the number corresponding to the calculated amount of electricity to the load and perform a discharging operation, wherein the charging operation and the discharging operation are performed simultaneously.

The charging operation may include: a charge initialization operation in which the main controller sets n (n≤N) for determining the charge order of the N battery packs to 1 a charge initialization operation in which the main controller sets n (n≤N) for determining the charge order of the N battery packs to 1 so that the N battery packs, starting from a first battery pack, are connected to the external charge source and charged; and a charging performing operation in which, when charging of the first battery pack is completed, the main controller updates n to n=n+1 so that the remaining battery packs up to the N-th battery pack are sequentially charged.

The charging operation may further include: an operation in which the main controller selects one of a plurality of external charge sources.

The selecting of an external charge source may further include: an operation in which, when the selected external charge source is switched, the main controller opens an input relay unit of n-th battery pack being charged and controls a plurality of connection switches connecting the plurality of external charge sources to the power station to perform charging from the switched external charge source.

The charging operation may further include: an operation in which, when at least one of the N battery packs is to be separated from the power station and an amount of charge of the battery pack to be separated is lower than a certain level, the main controller transmits a separation unavailability signal to an output unit, and when the amount of charge is equal to or higher than the certain level, the main controller opens an input relay unit and an output relay unit of the battery pack to be separated, and when the battery pack to be separated is separated, the main controller performs the charge initialization operation to check the charge order.

The charging operation may further include: an operation in which, when an external battery pack is mounted in the power station, the main controller opens an input relay unit and an output relay unit in a position in which the external battery pack is to be mounted, and when the external battery is mounted, the main controller performs the charge initialization operation to check the charge order.

The discharging operation may further include: an operation in which, when at least one of the N battery packs is to be separated from the power station and a remaining amount of electricity of the other battery packs excluding the battery pack to be separated is less than the amount of electricity required by the load being currently connected, the main controller transmits a load amount excess signal to an output unit, and when the load is equal to or greater than the required amount of electricity, the main controller opens an input relay unit and an output relay unit of the battery pack to be separated, and when the battery pack to be separated is separated, the main controller performs the charge initialization operation to check the charge order.

The discharging operation may further include: an operation in which, when an external battery pack is mounted in the power station, the main controller opens an input relay unit and an output relay unit in a position in which the external battery pack is to be mounted, and thereafter, when the external battery pack is mounted, the main controller performs the charge initialization operation to check the charge order.

The power station may further include: a sensor unit calculating a remaining amount of electricity and voltage of the N battery packs and transmitting the calculated amount of electricity and voltage to the main controller, wherein the discharging operation may further include: an operation in which when at least one of the N battery packs is lower than a certain voltage level, the main controller opens an output relay unit of a battery pack having a voltage level lower than the certain voltage level, and thereafter, the main controller closes an input relay unit of the battery pack having a voltage level lower than the certain voltage level, and performs the charge initialization operation to check the charge order.

In another aspect, a power station for simultaneously perform charging and discharging includes: N (N is a natural number equal to or smaller than 2) battery packs receiving power from an external charge source and supplying power to a load; N input relay units connecting the N battery packs to the charge source; N output relay units connecting the N battery packs to the load; and a main controller controlling the input relay units and the output relay units, wherein the main controller performs charging according to a determined order by controlling the N input relay units, and when the load is connected from the outside during the charging operation, the main controller calculates an amount of electricity required by the load and controls the N output relay units to connect battery packs by the number corresponding to the calculated amount of electricity to the load to perform discharging.

The main controller may set n (n≤N) for determining a charge order of the N battery packs to 1 so that a first battery pack is connected to the external charge source and charged, and when charging of the first battery pack is completed, the main controller may update n to n=n+1 so that the other battery packs up to n-th battery pack are sequentially charged.

The power station may further include a connection switch connecting the external charge source to the N input relay units, wherein the main controller may select one of a plurality of external charge sources.

When the selected external charge source is switched, the main controller may open an input relay unit of the n-th battery pack being charged and control the connection switch so that charging may be performed from a switched external charge source.

When at least one of the N battery packs is to be separated from the power station and an amount of charge of the battery pack to be separated is lower than a certain level, the main controller may transmit a separation unavailability signal to an output unit, and when the amount of charge is equal to or higher than the certain level, the main controller may open an input relay unit and an output relay unit of the battery pack to be separated.

When the separated battery pack is mounted in the power station, the main controller may open an input relay unit and an output relay unit of the separated battery pack.

When at least one of the N battery packs is to be separated from the power station and a remaining amount of electricity of the other battery packs excluding the battery pack to be separated is less than the amount of electricity required by the load being currently connected, the main controller may transmit a load amount excess signal to an output unit, and when the load is equal to or greater than the required amount of electricity, the main controller may open an input relay unit and an output relay unit of the battery pack to be separated.

The power station may further include: a sensor unit calculating a remaining amount of electricity and voltage of the N battery packs and transmitting the calculated amount of electricity and voltage to the main controller, wherein, when at least one of the N battery packs is lower than a certain voltage level, the main controller may open an output relay unit of the battery pack having a voltage level lower than the certain voltage level.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof is omitted. The terms used henceforth are used to appropriately express the embodiments of the present disclosure and may be altered according to a person of a related field or conventional practice. Therefore, the terms should be defined on the basis of the entire content of this disclosure.

Technical terms used in the present specification are used only in order to describe specific exemplary embodiments rather than limiting the present disclosure. The terms of a singular form may include plural forms unless referred to the contrary. It will be further understood that the terms "comprise" and/or "comprising," when used herein, specify the presence of stated features, integers, steps, operations, elements, and/or components, but do not preclude the presence or addition of one or more other features, regions, integers, steps, operations, elements, components, and/or groups thereof.

Hereinafter, a method for controlling charging and discharging of a power station 1 equipped with multiple battery packs 400 according to an embodiment of the present disclosure will be described with reference to FIGS. 1 to 8.

The present disclosure relates to a method and system for controlling a power station 1 equipped with multiple battery packs 400 to be exchanged so as to simultaneously perform charging and discharging. The method of controlling charging and discharging of the power station 1 equipped with multiple battery packs 400 according to the present disclosure is performed by a main controller 100 provided in the power station 1.

Figure 1:
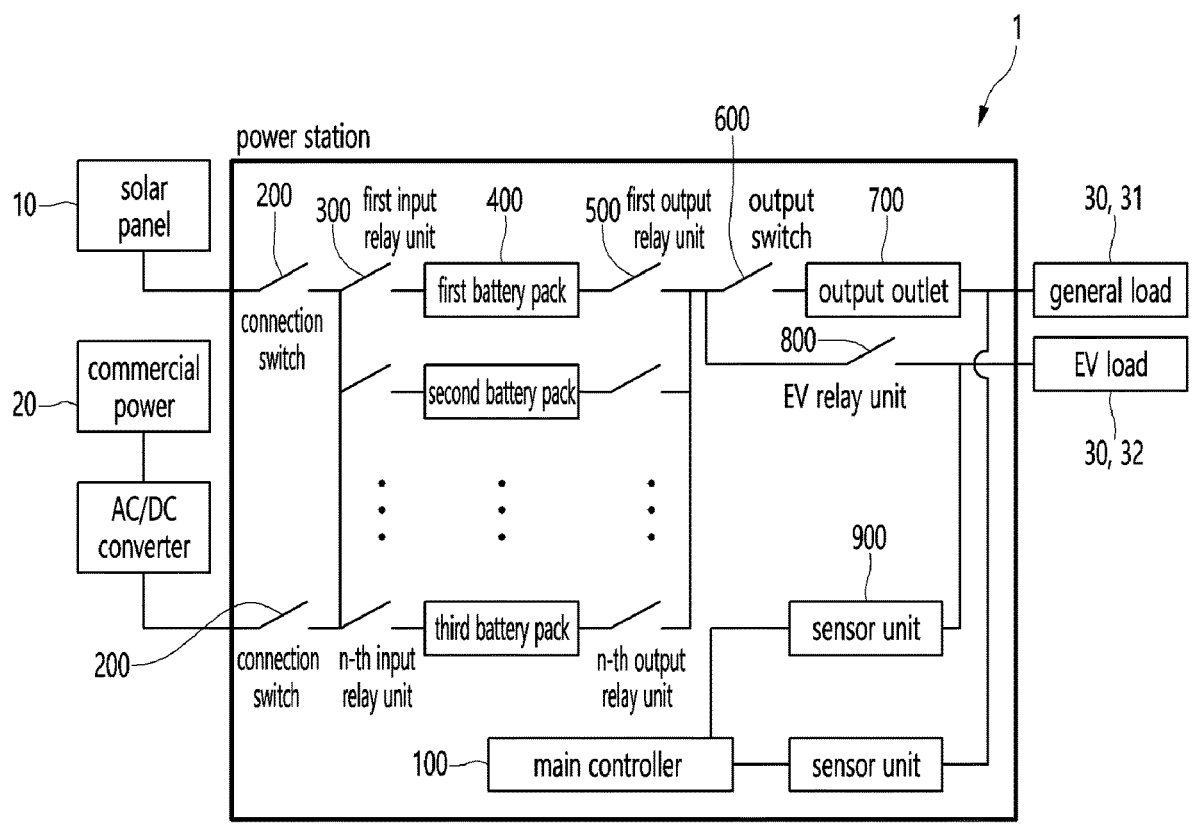
FIG. 1 is a block diagram of a power station according to an embodiment of the present disclosure.

FIG. 1 is a block diagram of the power station 1 of the present disclosure. The power station 1 of the present disclosure is connected to a solar panel 10 and a commercial power 20, which are external charge sources, and charged. In particular, since the commercial power 20 is AC power, AC power is converted into DC through an AC-DC converter to supply power to the power station 1. Here, the commercial power 20 may refer to various commercial powers 20 such as 110V, 220V, and 330V. The solar panel 10 refers to a module capable of converting sunlight into electrical energy using a photoelectric effect.

The power station 1 of the present disclosure may be connected to various types of loads 30, and in particular, the power station 1 may be connected to an electric vehicle, which may be driven by electricity as power by charging a battery with electricity, to supply power.

The power station 1 of the present disclosure includes a plurality of battery packs 400, a connection switch 200 that may select an open, an input relay unit 300 for charging a specific battery pack 400 between the connection switch 200 and the battery pack 400, an output outlet 700 connected to a general load 31, an output switch 600 for discharging a specific battery pack 400 between the output outlet 700 and the battery pack 400, an EV relay unit 800 connected to an EV load 32, a sensor unit 900 calculating an amount of electricity of the load 30, a main controller 100 comprehensively controlling the power station 1, and an output unit 1000 displaying an output message for a user.

Figure 2:
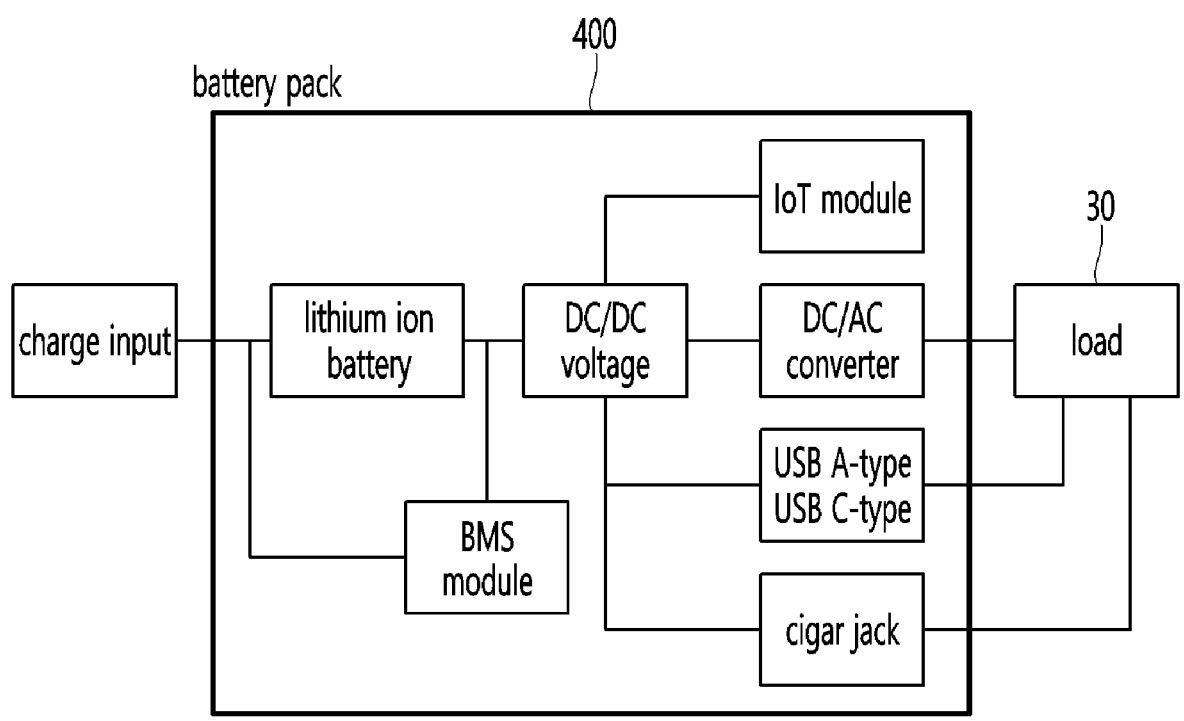
FIG. 2 is a block diagram of a battery pack mounted in a power station according to an embodiment of the present disclosure.

FIG. 2 is a block diagram of the battery pack 400 mounted in the power station 1 of the present disclosure. As shown in FIG. 2, the battery pack 400 is configured as a lithium ion battery and may supply power at various voltages by a DC-DC converter, so that the battery pack 400 may supply power to an IoT module, a USB-A type terminal, a USB-C type terminal, and a cigar jack, etc. In addition, the battery pack 400 may be connected to the load 30 requiring AC power through a DC-AC converter, and supply power thereto. Although not clearly indicated in FIG. 2, each of the battery packs 400 of the present disclosure may be detachably mounted in each slot provided in the power station 1. Through this, the battery pack 400 may be separated (or disconnected or detached) from the power station 1 to supply power to various devices. For example, the discharged battery pack 400 and the charged battery pack 400 may be used interchangeably in a device driven using a battery, such as an electric two-wheeled vehicle.

Referring back to FIG. 1, the connection switch 200 is located between the external charge source and the input relay unit 300. The connection switch 200 allows which of opens, among the solar panel 10 and the commercial power 20, to be selected to charge the battery pack 400. That is, in the case of charging the battery pack 400 with the solar panel 10, the connection switch 200 connected to the solar panel 10 is closed and the connection switch 200 connected to the commercial power 20 is open. In the case of charging the battery pack 400 with the commercial power 20, the connection switch 200 connected to the commercial power 20 is closed, and the connection switch 200 connected to the solar panel 10 is open. As will be described later, the connection switch 200 may be controlled to be open or closed by the main controller 100.

The input relay unit 300 is positioned between the connection switch 200 and the battery pack 400. As shown in FIG. 1, the input relay units 300 may be connected to the battery packs 400, respectively. The input relay unit 300 may be open or closed so that which of the battery packs 400 is to be charged. That is, the battery pack 400 in which the input relay unit 300 is closed may be charged, and the battery pack 400 in which the input relay unit 300 is open may not be charged. Through this, a charge order of the battery pack 400 may be determined according to a certain rule determined by the main controller 100. As will be described later, the input relay unit 300 may be controlled to be open or closed by the main controller 100.

The output relay unit 500 is positioned between the output switch 600 and the plurality of battery packs 400. As shown in FIG. 1, the output relay units 500 may be connected to the battery packs 400, respectively. The output relay unit 500 may be open or closed so that which of the battery packs 400 is to be selected to be discharged. That is, the battery pack 400 in which the output relay unit 500 is closed may be discharged, and the battery pack 400 in which the output relay unit 500 is open may not be discharged. Through this, a discharge order of the battery pack 400 may be determined according to a certain rule determined by the main controller 100. As will be described later, the output relay unit 500 may be controlled to be open or closed by the main controller 100.

Figure 3:
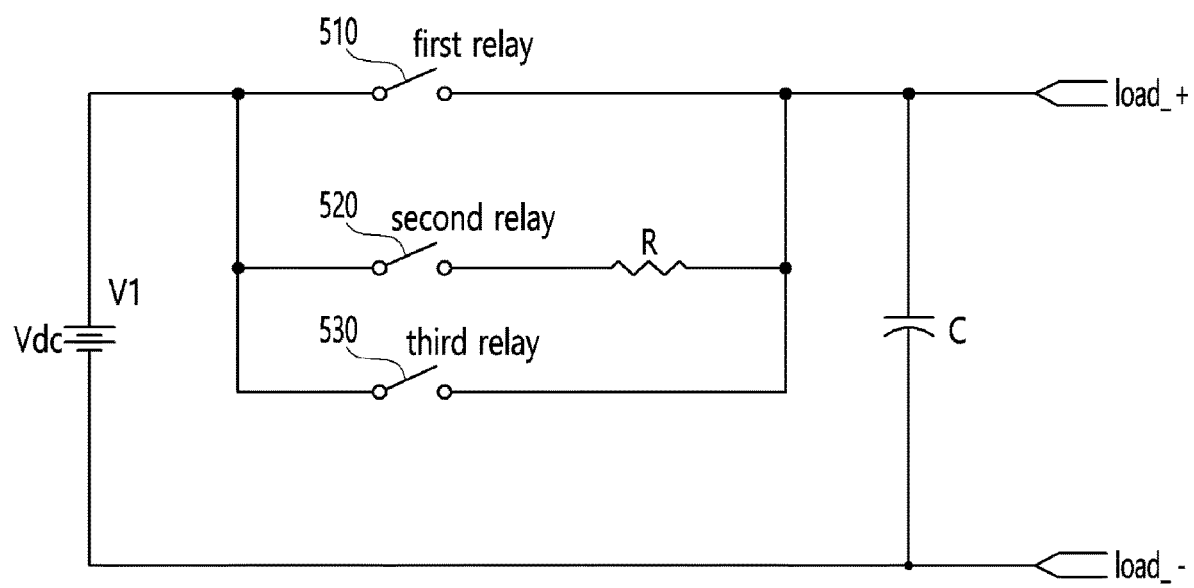
FIG. 3 is a circuit diagram of an output relay unit according to an embodiment of the present disclosure.

FIG. 3 is a circuit diagram of the output relay unit 500. If the first relay 510 is closed while the second relay 520 and the third relay 530 are open, theoretically infinite current flows. In this case, sparks or arcs may occur in a circuit and the battery pack 400 or the load 30 connected to the circuit may be damaged. To prevent this, the first relay 510 may not be closed until the second relay 520 is closed first and a capacitor is charged with charges.

Conversely, when the output relay unit 500 is open, if the second relay 520 is open first, sparks or arcs may occur in the circuit. To prevent this, the first relay 510 is open first, and then the second relay 520 is open. The input relay unit 300 has a structure in which the circuit diagram of FIG. 3 is symmetrically configured (in the input relay unit 300, an external charge source is located instead of the load 30), and major functions thereof are the same.

The output switch 600 is located between the output outlet 700 and the output relay unit 500. When the output switch 600 is closed, power may be supplied to the general load 31, and when the output switch 600 is open, power cannot be supplied to the general load 31.

The output outlet 700 may be connected to the output switch 600 and the general load 31. Various types of general loads 31 may be connected to the output outlet. If the power station 1 is installed in a home, various types of electrical appliances used in the home may be connected to the power station 1. If the power station 1 is installed in a factory, various types of work tools used in the factory may be connected to the power station 1.

The EV relay unit 800 is positioned between the EV load 32 and the output relay unit 500. When the EV relay unit 800 is closed, power may be supplied to the EV load 32, and when the EV relay unit 800 is open, power cannot be supplied to the EV load 32. Here, the EV load 32 refers to a moving means driven by charging a battery, such as an electric vehicle.

The main controller 100 may open or close the output switch 600 or the EV relay unit 800 so that to which type of load 30 the battery pack 400 is to be discharged. That is, when the output switch 600 is closed, power may be supplied to the general load 31, and when the EV relay unit 800 is closed, power may be supplied to the EV load 32. In this case, since the output switch 600 and the EV relay unit 800 operate alternately with each other, when any one thereof is open, the other is closed. Through this alternative connection, the power station 1 of the present disclosure may selectively supply power to a desired load 30.

The sensor unit 900 measures the amount of electricity of the load 30 and the amount of charge of the battery pack 400. The amounts of power and charge measured by the sensor unit 900 are transmitted to the main controller 100, and the main controller 100 may control the connection switch 200, the input relay unit 300, the output relay unit 500, the output switch 600 or the EV relay unit 800 based on the measured amounts of power and charge.

The main controller 100 controls the connection switch 200, the input relay unit 300, the output relay unit 500, the output switch 600, or the EV relay unit 800 as described above. The main controller 100 controls the input relay unit 300 to be open or closed according to a certain rule so that a specific battery pack 400 may be charged. In addition, the main controller 100 controls the output relay unit 500 to be open or closed according to a certain rule so that a specific battery pack 400 may be discharged.

The output unit 1000 outputs information related to control or information of the power station 1 to the user. The output unit 1000 refers to a device for visually delivering information to a user, such as a touch screen or a monitor.

A more specific function of each component will be described in detail below while explaining a method of controlling charging or discharging of the power station 1 equipped with multiple battery packs 400.

Hereinafter, each operation of the method of controlling charging and discharging of the power station 1 equipped with multiple battery packs 400 according to an embodiment of the present disclosure will be described.

The method of controlling charging and discharging of the power station 1 equipped with multiple battery packs 400 according to an embodiment of the present disclosure includes an operation in which the main controller 100 controls the input relay unit 300 for connecting the plurality of battery packs 400 to an external charge source to perform charging according to a determined charge order and an operation in which, when the load 30 is connected from the outside during the charging operation, the main controller 100 calculates the amount of electricity required by the load 30 and controls N output relay units 500 connecting N battery packs 400 to the load 30 to connect the battery packs 400 by the number corresponding to the calculated amount of electricity to the load 30 to discharge the battery packs 400.

Figure 4:
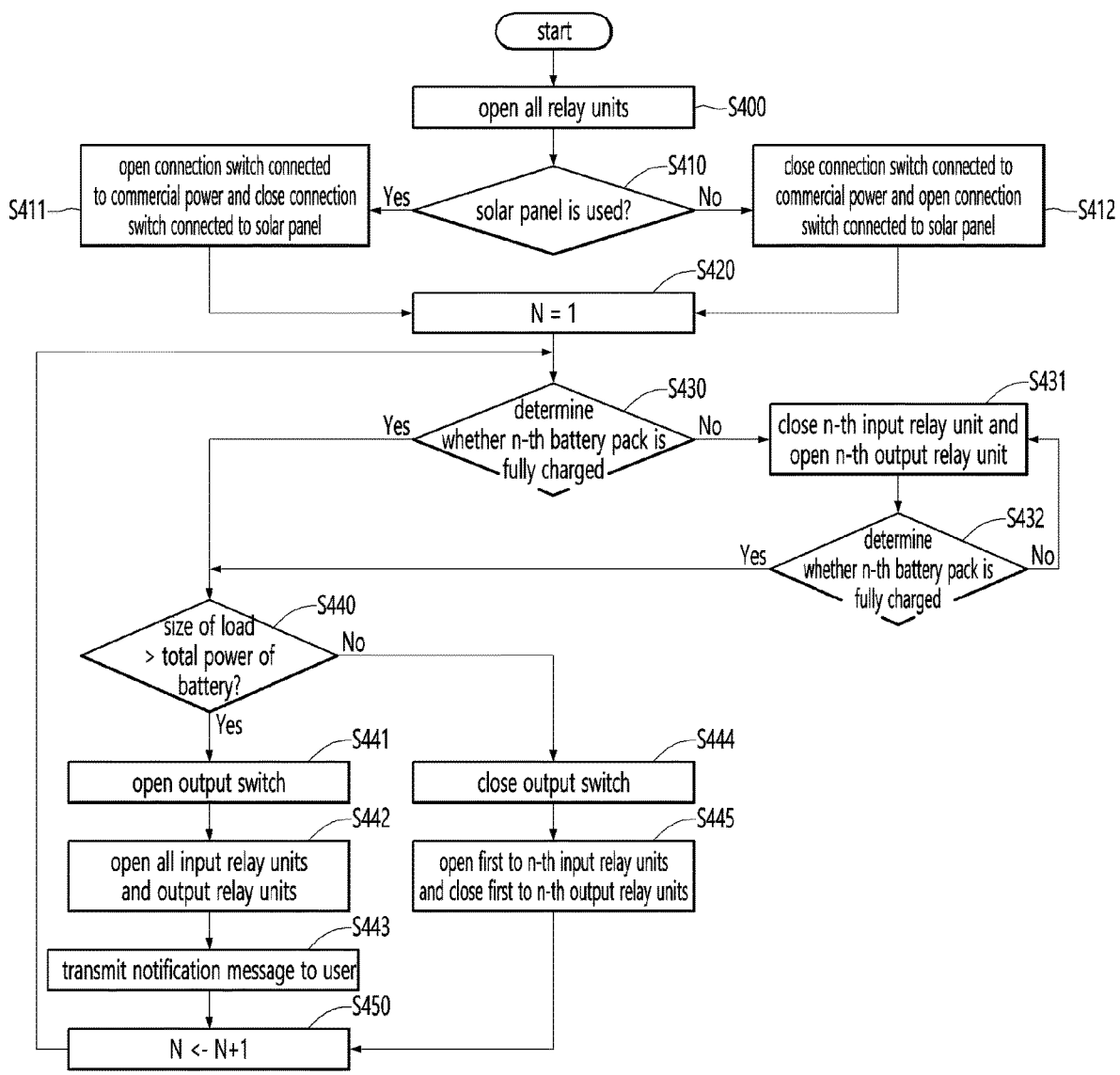
FIG. 4 is a flowchart of a method of controlling charging and discharging of a power station equipped with multiple battery packs according to an embodiment of the present disclosure.

FIG. 4 is a flowchart of a method of controlling charging and discharging of the power station 1 equipped with multiple battery packs 400 according to an embodiment of the present disclosure.

Referring to the charging operation, the main controller 100 opens all the input relay unit 300 and the output relay unit 500 before starting charging of the battery pack 400 (S400). Here, the input relay unit 300 and the output relay unit 500 are open because which of the battery packs 400 is to be charged or discharged is not selected yet.

When all the input relay units 300 and output relay units 500 are open, the main controller 100 selects one of a plurality of external charge sources as a charging power (S410). As described above, the external charge source may correspond to the commercial power 20 and the solar panel 10. When a charge source is selected, the main controller 100 closes the connection switch 200 connected to the corresponding charge source and opens the connection switch 200 for the other charge source (S411 and S412). For example, when the solar panel 10 is selected as the charge source, the main controller 100 may close the connection switch 200 connected to the solar panel 10 and may open the connection switch 200 connected to the commercial power 20.

When the charge source is selected, the main controller 100 sets n (n≤N), which is a variable for determining a charge order among the plurality of battery packs 400, to 1 (S420). Through this, a first battery pack 400 may be connected to an external charge source and charged. The reason for setting the charge order to 1 is to start charging the batteries, starting from the battery mounted in the uppermost slot (n=1) even if the battery is charged, discharged, mounted, or detached, as will be described later.

When the charge order is set to 1, the main controller 100 determines whether n-th (here, n=1) battery pack 400 is fully charged (S430). Whether the battery pack 400 is fully charged may be determined based on the amount of charge of the battery pack 400 measured by the sensor unit 900 as described above. When the n-th battery pack 400 is not fully charged, the main controller 100 closes the n-th input relay unit 300 and opens the n-th output relay unit 500 (S431). This is to charge the n-th battery pack 400. The main controller 100 detects in real time whether the n-th battery pack 400 currently being charged is fully charged through the sensor unit 900. When the n-th battery pack 400 is fully charged and the load 30 is not connected, the main controller 100 sets the charge order n to n+1 (S450). This is to charge (n+1)-th battery pack 400, which is a next charge order. Thereafter, a subsequent order is the same as the order of charging the n-th battery pack 400. In this disclosure, although it is described that the charge order starts from charging the first battery pack 400, but it will be obvious to those skilled in the art that, when the first battery pack 400 is fully charged, the second battery pack 400, which is a next charge order, is charged in a very short time.

Hereinafter, the discharging operation will be described. When the load 30 is connected from the outside during the charging operation described above, the main controller 100 calculates the amount of electricity required by the general load 31 (S440). This is because, if the amount of electricity required by the general load 31 is greater than the sum of the amount of charges of all the battery packs 400 mounted in the power station 1, the power station 1 cannot properly supply power to the general load 31. Conversely, if the amount of electricity required by the general load 31 is smaller than the sum of the amounts of charges of all the battery packs 400 mounted in the power station 1, there will be no problem in supplying power.

If the amount of electricity required by the general load 31 is greater than the sum of the amounts of charges of all the battery packs 400 mounted in the power station 1, the main controller 100 opens the output switch 600 (S441). This is to stop the power station 1 from supplying power to the general load 31 anymore. Thereafter, the main controller 100 opens all the input relay units 300 and the output relay units 500 (S442). This is for charging by determining whether to charge the first battery pack 400. In this case, the main controller 100 may inform the user through the output unit 1000 that the amount of charge of the battery pack 400 mounted in the power station 1 is insufficient through a notification message (S443). Thereafter, the main controller 100 sets n, which is the charge order, to n+1 so that the (n+1)-th battery pack 400 may be charged (S450).

If the amount of electricity required by the general load 31 is smaller than the sum of the amounts of charges of all the battery packs 400 mounted in the power station 1, that is, if the sum of the amounts of charges of the first to n-th battery packs 400, is greater than the amount of electricity required by the general load 31, the main controller 100 closes a switch connected to the general load 31 among the switches of the output outlet (S444). In addition, the main controller 100 opens all the input relay units 300 of the n-th battery pack 400 and the first to (n−1)-th battery pack 400 and closes the output relay unit 500 (S445). This is because, as described above, since the power station 1 of the present disclosure charges the battery packs, starting from the first battery pack 400, it is efficient to supply power to the general load 31 in order from the first battery pack 400. That is, the first to n-th battery packs 400 are used to supply power to the general load 31. Thereafter, the main controller 100 sets the charge order n to n+1 so that the (n+1)-th battery pack 400 may be charged (S450).

The charging and discharging operates of the main controller 100 have been described above. Hereinafter, a method of controlling the power station 1 by the main controller 100 according to some events that may occur in the charging or discharging operation will be described.

Figure 5:
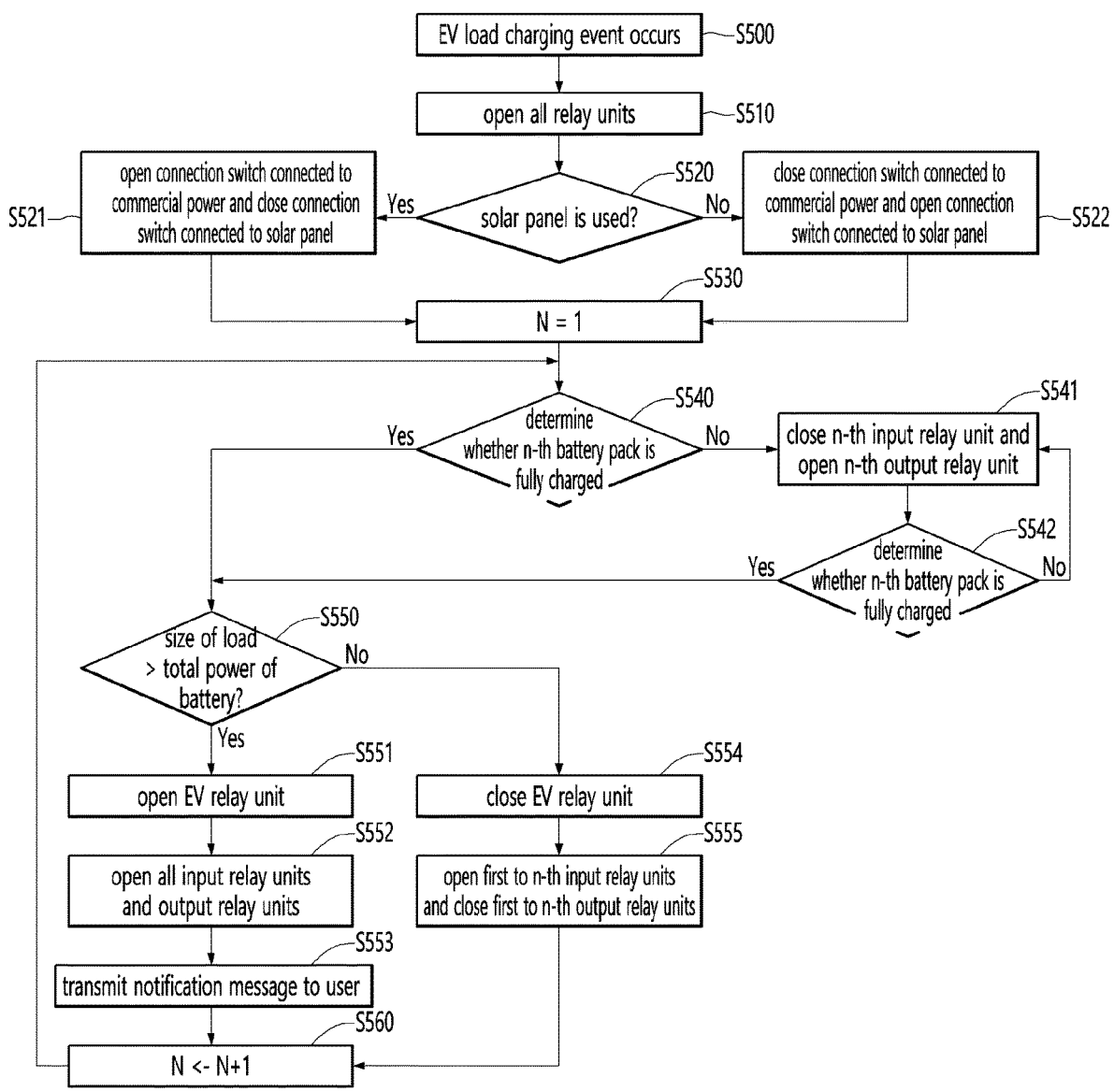
FIG. 5 is a flowchart illustrating a process performed by a main controller when an event of charging an EV load occurs according to an embodiment of the present disclosure.

A first event that may occur is an event in which the EV load 32 is connected to charge the EV load 32. As shown in FIG. 5, the operation performed by the main controller 100 as the EV load 32 charging event occurs are mostly overlap the charging and discharging operations described above, so only the differences will be described below. When the EV load 32 charging event occurs (S500), all the input relay units 300 and output relay units 500 are open (S510) and an external charge source is selected (S520). Thereafter, n, which is a charge order, is set to 1 (S530), and it is determined whether the n-th battery pack 400 is fully charged (S540). When the n-th battery pack 400 is fully charged, a required amount of electricity of the EV load 32 may be compared with the sum of the amounts of charges of all the battery packs 400 mounted in the power station 1 and it is determined whether to continue charging or whether to supply power to the EV load 32 (S550). If the amount of electricity of the EV load 32 is large, the EV relay unit 800 is open and all input relay units 300 and output relay units are open (S551). Also, a notification message indicating that the amount of charge of the power station 1 is insufficient is transmitted to the user (S552). If the amount of electricity of the EV load 32 is smaller, the EV relay unit 800 is closed (S554), the input relay units 300 of the first to n-th battery packs 400 are open, and the output relay unit 500 is closed (S555). Thereafter, the charge order n is updated to n+1 (S560).

A second event that may occur is an event in which the external charge source is switched. The charge source may be switched according to a change in an external environment, and in particular, in a state in which the solar panel 10 is used as an external charge source, the external charge source may be switched the commercial power 20 according to a change in weather. The main controller 100 may be connected to a sensor that detects temperature, humidity, time, etc. or to an external server that provides weather information of a place where the power station 1 is installed, and accordingly, the external charge source may be switched by determining changes in the external environment. Alternatively, whether to switch the external charge source may be determined by recognizing a usage pattern of the user and deep learning the usage pattern. For example, since charging through the solar panel 10 is limited after sunset, the main controller 100 may control the connection switch 200 to switch the external charge source thereafter. The external charge source may also be switched by a user's manual operation.

Figure 6:
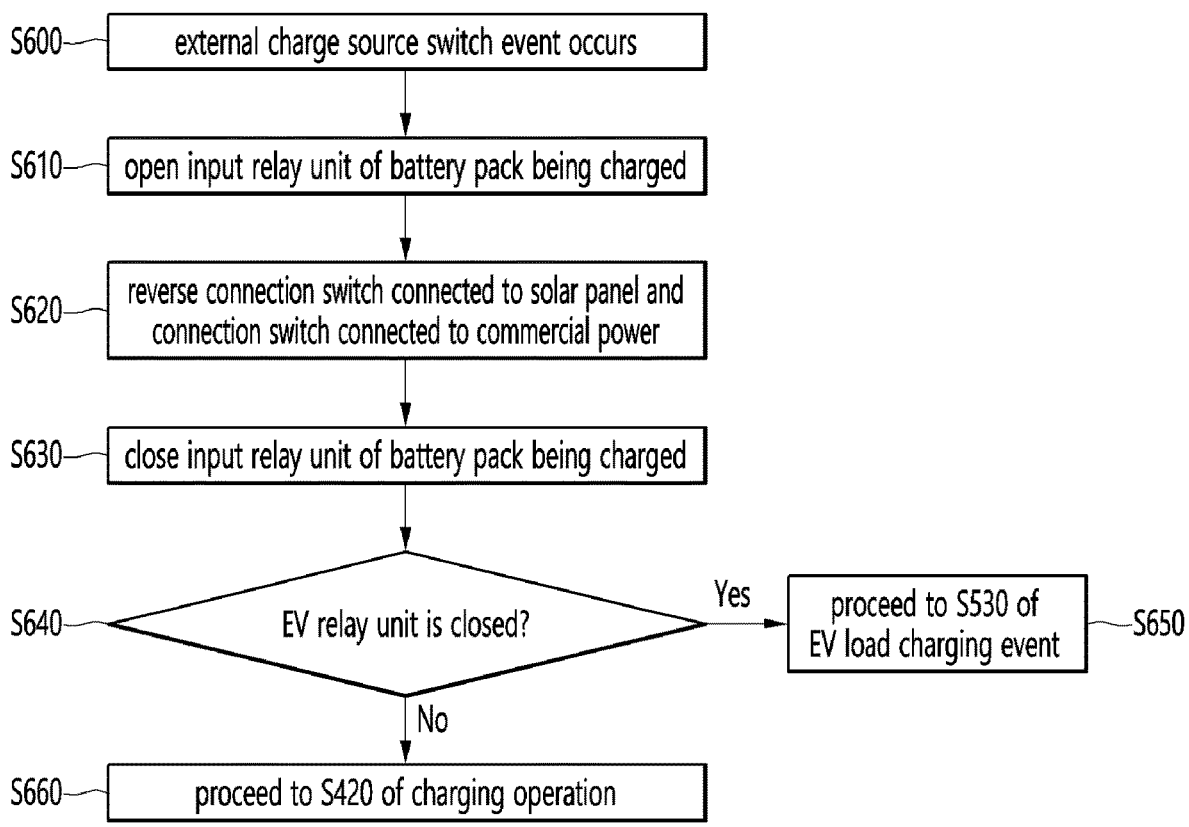
FIG. 6 is a flowchart illustrating a process performed by a main controller when an event in which an external charge source is switched occurs according to an embodiment of the present disclosure.

Referring to FIG. 6, when an external charge source switch event occurs by a user's operation or control of the main controller 100 (S600), the input relay unit 300 of the battery pack 400 being charged is open (S610). This is to prevent damage to the battery pack 400 as the connection switch 200 is open or closed due to a change in the external charge source. Thereafter, the connection switch 200 connected to the solar panel 10 and the connection switch 200 connected to the commercial power 20 are mutually reversed (S620). For example, in the case of switching the external charge source from the solar panel 10 to the commercial power 20, the switch connected to the solar panel 10 is open and the switch connected to the commercial power 20 is closed. When the connection switch 200 is reversed, the input relay unit 300 of the battery pack 400 being charged is closed (S630). Thereafter, when the EV load 32 is connected, that is, when the EV relay unit 800 is closed, the process proceeds to operation S530 of the EV load 32 charging event described above to supply power to the EV load 32 (S641). If the EV relay unit 800 is in an open state, the process proceeds to operation S420 of the charging operation described above to charge the battery pack 400 (S642).

Figure 7:
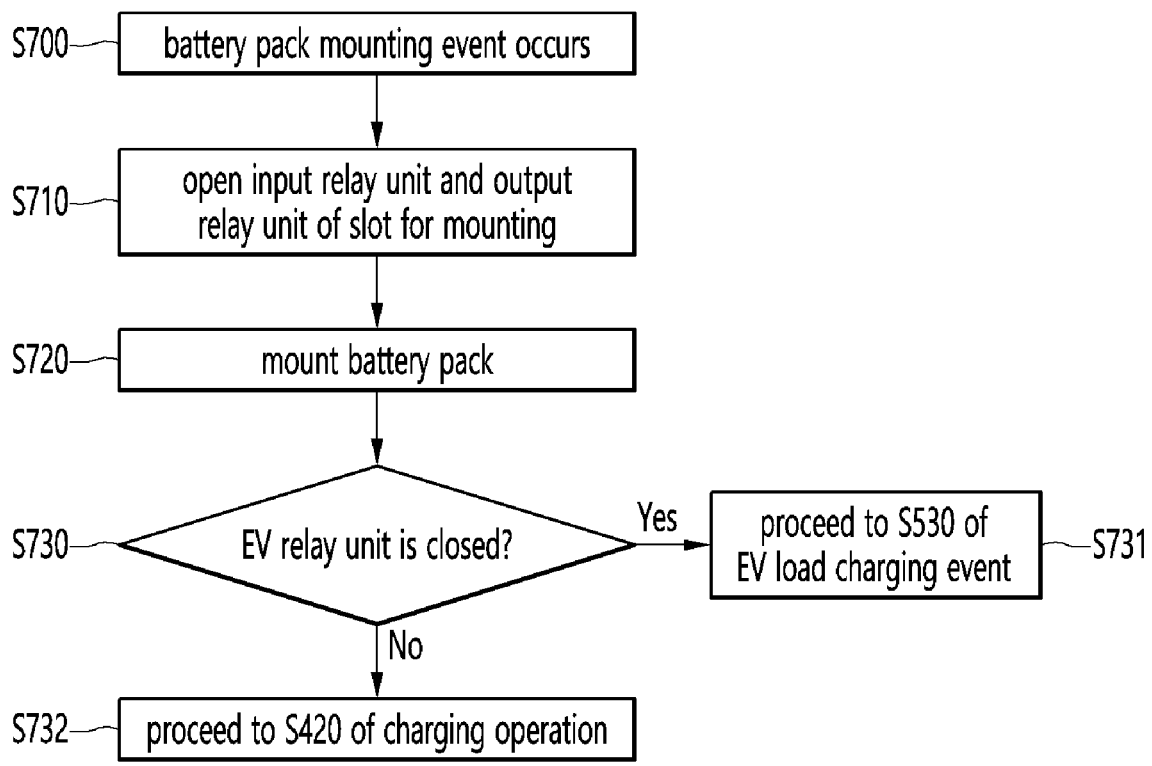
FIG. 7 is a flowchart illustrating a process performed by a main controller when an event in which a battery pack is mounted occurs according to an embodiment of the present disclosure.

A third event that may occur is an event in which a separated battery pack 400 is mounted in an empty slot. Since the battery pack 400 is detachable as described above, the detached battery pack 400 may be remounted in the power station 1. Referring to FIG. 7, when a mounting event occurs (S700), the main controller 100 opens the input relay unit 300 and the output relay unit 500 connected to a slot in which the battery pack 400 is to be mounted (S710). For example, when the battery pack 400 is mounted in the n-th slot, the n-th input relay unit 300 and the n-th output relay unit 500 are open. When the n-th input relay unit 300 and the n-th output relay unit 500 are open, the battery pack 400 may be mounted in the corresponding slot (S720). Thereafter, when the EV load 32 is connected, that is, when the EV relay unit 800 is closed, the process proceeds to operation S530 of the EV load 32 charging event described above to supply power to the EV load 32 (S731). If the EV relay unit 800 is in an open state, the process proceeds to operation S420 of the charging operation described above to charge the battery pack 400 (S732).

A fourth event that may occur is an event in which some of the battery packs 400 is separated during charging. The user may separate the battery pack 400 from the power station 1, and here, the battery pack 400 may be separated even when the battery pack 400 is being charged. However, the battery pack 400 may be separated only when the battery pack 400 to be separated exceeds a certain amount of charge, so that the user may selectively separate the battery pack 400 in which the amount of charge is sufficient.

Figure 8:
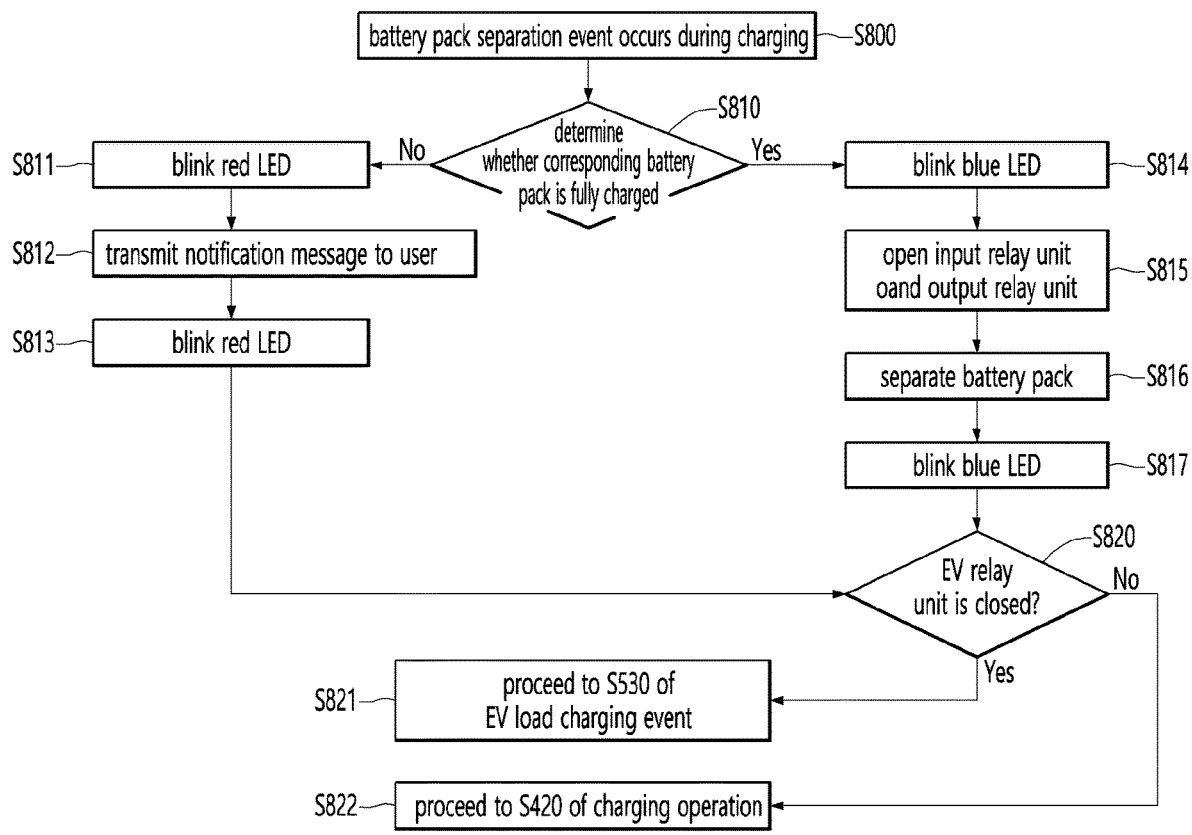
FIG. 8 is a flowchart illustrating a process performed by a main controller when an event in which a battery is disconnected occurs in during charging according to an embodiment of the present disclosure.

As shown in FIG. 8, when a separation event occurs (S800), the main controller 100 determines whether the battery pack 400 to be separated is charged to a certain amount or more through the sensor unit 900 (S810). If it is less than the certain amount of charge, the main controller 100 blinks a red LED (S811) and displays the insufficient amount of charge as a notification message through the output unit 1000 (S812). Thereafter, the red LED stops blinking (S813) and the main controller 100 determines whether the EV relay unit 800 is in closed (S820). If the battery pack 400 is charged by more than the certain amount of charge, a blue LED blinks (S814), and the input relay unit 300 and the output relay unit 500 connected to the corresponding battery pack 400 are open (S815). When the input relay unit 300 and the output relay unit 500 are open, the battery pack 400 is separated (S816) and the blue LED stops blinking (S817). Thereafter, the main controller 100 determines whether the EV relay unit 800 is in a closed state (S820).

If the EV load 32 is connected, that is, the EV relay unit 800 is closed, the process proceeds to operation S530 of the EV load 32 charging event as described above to supply power to the EV load 32 (S821). If the EV relay unit 800 is in an open state, the process proceeds to operation S420 of the charging operation described above to charge the battery pack 400 (S822).

Figure 9:
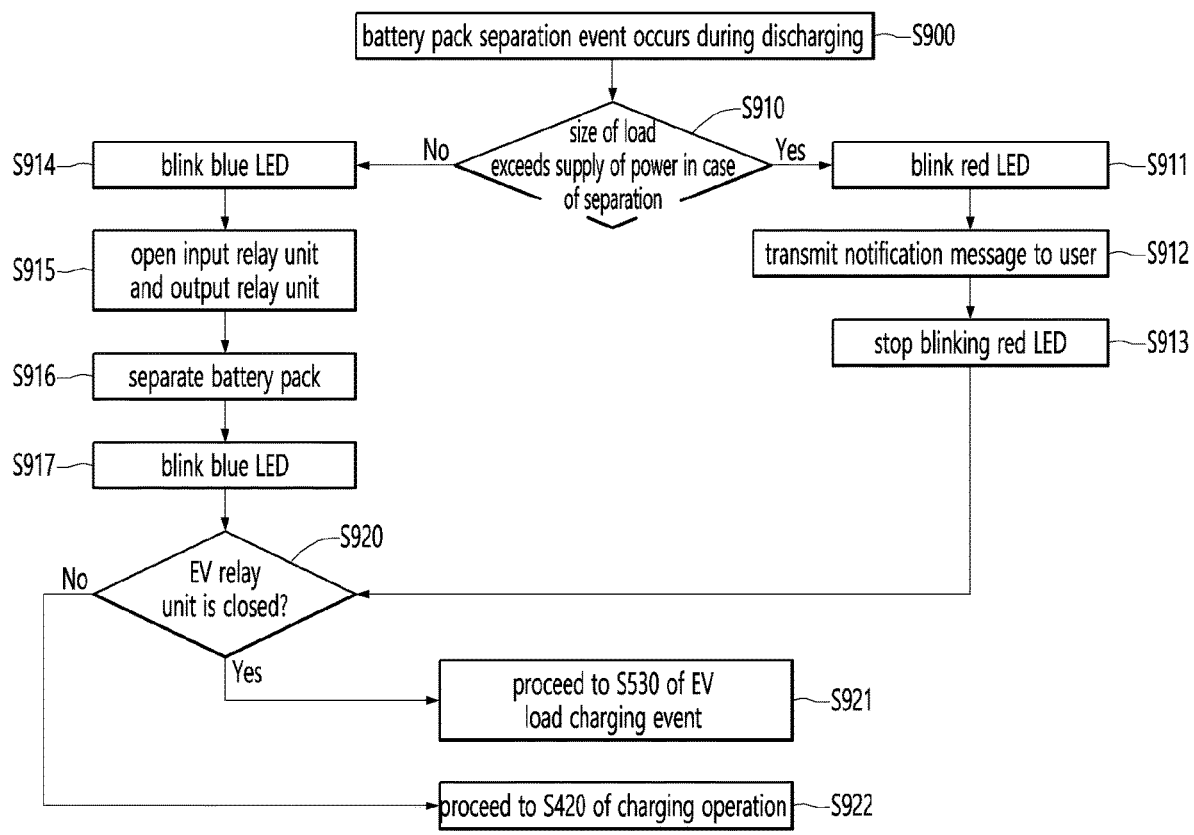
FIG. 9 is a flowchart illustrating a process performed by a main controller when an event in which a battery is disconnected occurs during discharging according to an embodiment of the present disclosure.

A fifth event that may occur is an event in which some of the battery packs 400 is separated during discharging. This event includes a case in which some of the battery packs 400 is separated while charging and discharging are simultaneously performed. When the battery pack 400 is separated during discharging, it is a problem whether power to be supplied to the currently connected general load 31 may be maintained even after separation. Accordingly, when a separation event occurs (S900) as shown in FIG. 9, the main controller 100 compares the amount of electricity required by the general load 31 with the sum of amounts of charges of the other remaining packs 400 mounted in the power station 1 after the separation of the battery pack 400 (S910).

If the amount of electricity required by the general load 31 is larger, the separation of the battery pack 400 should not be allowed. This is because, if separation is allowed, power cannot be normally supplied to the currently connected general load 31. Therefore, in this case, when the separation event occurs, the main controller 100 blinks a red LED (S911) and displays a notification message indicating that the amount of charge is insufficient in the case of separation through the output unit 1000 (S912). Thereafter, when the red LED stops blinking (S913), the main controller 100 determines whether the EV relay unit 800 is in a closed state (S920).

If the amount of electricity required by the general load 31 is smaller, separation of the battery pack 400 to be separated. Therefore, in this case, when a separation event occurs, the main controller 100 blinks the blue LED (S914) and opens the input relay unit 300 and the output relay unit 500 connected to the corresponding battery pack 400 (S915). When the input relay unit 300 and the output relay unit 500 are open, the battery pack 400 is separated (S916) and the blue LED stops blinking (S917). Thereafter, the main controller 100 determines whether the EV relay unit 800 is in a closed state (S920).

If the EV load 32 is connected, that is, if the EV relay unit 800 is closed, the process proceeds to operation S530 of the EV load 32 charging event described above to supply power to the EV load 32 (S921). If the EV relay unit 800 is in an open state, the process proceeds to operation S420 of the charging operation described above to charge the battery pack 400 (S922). Although the above description has been made based on the assumption that the EV load 32 is separated, similar operations may be performed even when the general load 31 is separated.

Figure 10:
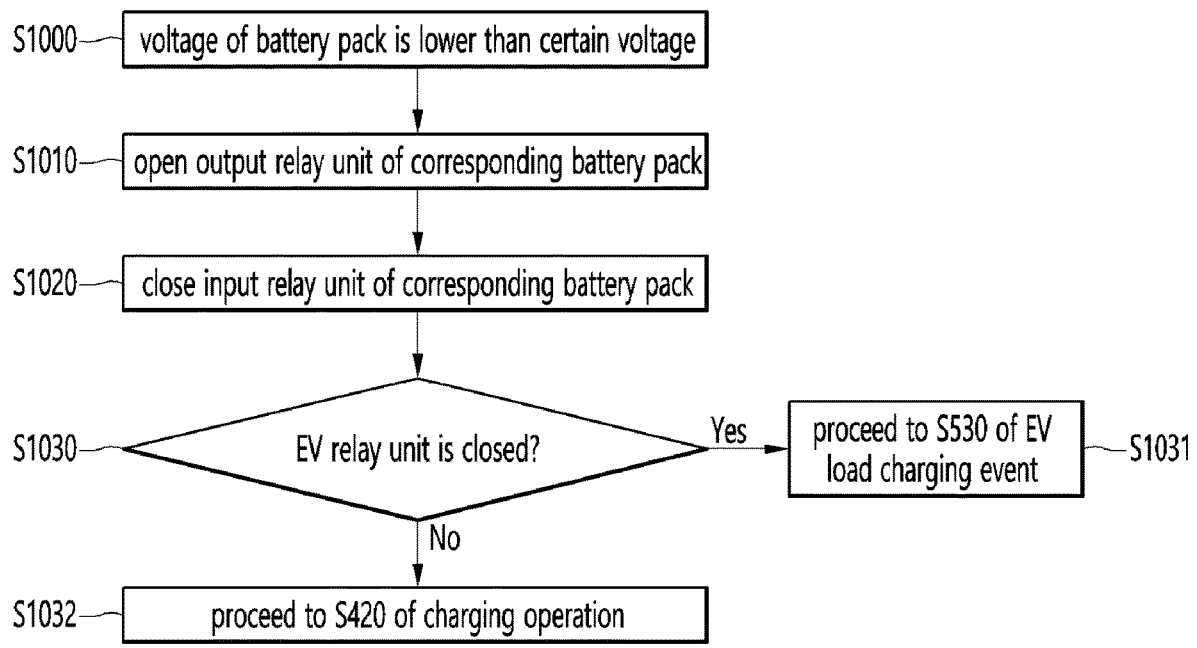
FIG. 10 is a flowchart illustrating a process performed by a main controller when an event in which an electromotive force of a battery is lower than a certain voltage occurs during discharging according to an embodiment of the present disclosure.

A sixth event that may occur is an event in which some of the battery packs 400 is lower than a certain voltage during the discharging operation. Due to the nature of the battery pack 400, if the amount of charge of the battery pack 400 is lowered, an electromotive force is also lowered, and thus, a voltage of the battery pack 400 may be lower than a voltage required by the load 30. In this state, power cannot be normally supplied to the load 30, and thus, the corresponding battery pack 400 has to stop supplying power to the load 30 and return to the charging operation. As shown in FIG. 10, when a voltage of a certain battery pack 400 is lower than the certain voltage (e.g., lower than 5V) (S1000), the main controller 100 opens the output relay unit 500 connected to the corresponding battery pack 400 (S1010). This is to stop the corresponding battery pack 400 from supplying power to the load 30. Then, the main controller 100 closes the input relay unit 300 connected to the battery pack 400 (S1020). This is to set the corresponding battery pack 400 to a chargeable state. Thereafter, if the EV load 32 is connected, that is, if the EV relay unit 800 is closed, the process proceeds to operation S530 of the EV load 32 charging event described above to supply power to the EV load 32 (S1031). If the EV relay unit 800 is in an open state, the process proceeds to operation S420 of the charging operation described above to charge the battery pack 400 (S1032).

The method of controlling the power station 1 by the main controller 100 according to several events that may occur in the charging or discharging operation has been described.

The technical features disclosed in each embodiment of the present disclosure are not limited only to the embodiments and may be combined and applied to different embodiments unless they are incompatible with each other.

As set forth above, in the method of controlling charging and discharging of a power station equipped with multiple battery packs according to an embodiment of the present disclosure, charging and discharging may be simultaneously performed in the power system on the whole by physically distinguishing between a battery pack to be charged and a battery pack to be discharged, thereby improving efficiency.

In addition, in the method of controlling charging and discharging of a power station equipped with multiple battery packs according to an embodiment of the present disclosure, battery packs may be separately used to increase portability and power may be supplied to a large-capacity load.

Effects according to the embodiments of the present disclosure are not limited by the contents exemplified above, and more various effects are included in the present disclosure.

In the above, the embodiments of the method of controlling charging and discharging of a power station equipped with multiple battery packs of the present disclosure has been described. The present disclosure is not limited to the embodiments described above and the accompanying drawings, and various modifications and variations may be made from the point of view of those of skilled in the art to which the present disclosure pertains. Accordingly, the scope of the present disclosure should be defined not only by the claims of the present disclosure but also by those claims and their equivalents.

What is claimed is:

1. A method of controlling charging and discharging of a power station equipped with multiple battery packs, performed by a power station including N wherein N is a natural number equal to or greater than 2, battery packs mounted to be electrically charged/discharged and including a main controller controlling the charging/discharging, the method comprising: charging, by the main controller, the N battery packs in a determined charge order by controlling N input relay units connecting the N battery packs to an external charge source; and when a load is connected from an outside during the a charging operation, calculating, by the main controller, an amount of electricity required by the load and controlling N output relay units connecting the N battery packs to the load to connect battery packs by a number corresponding to a calculated amount of electricity to the load and perform a discharging operation, wherein the charging operation and the discharging operation are performed simultaneously, wherein the charging operation includes: a charge initialization operation in which the main controller sets n wherein n<N for determining a charge order of the N battery packs to 1 so that the N battery packs, starting from a first battery pack, are connected to the external charge source and charged; and a charging performing operation in which, when charging of the first battery pack is completed, the main controller updates n to n=n+1 so that remaining battery packs up to an N-th battery pack are sequentially charged, wherein the discharging operation further includes: an operation in which, when at least one of the N battery packs is to be separated from the power station and a remaining amount of electricity of other battery packs than the at least one battery pack to be separated is less than the amount of electricity required by the load being currently connected, the main controller transmits a load amount excess signal to an output unit, and when the remaining amount of electricity of the other battery packs excluding the battery pack to be separated is equal to or greater than the amount of electricity required by the load being currently connected, the main controller opens an input relay unit and an output relay unit of the battery pack to be separated, and when the battery pack to be separated is separated, the main controller performs the charge initialization operation to check the charge order.

2. The method of claim 1, wherein the charging operation further includes: an operation in which the main controller selects a first external charge source from among a plurality of external charge sources.

3. The method of claim 2, wherein the selecting the first external charge source from among of an the plurality of external charge sources further includes: an operation in which, when the selected first external charge source is switched into a second external charge source, the main controller opens an input relay unit of n-th battery pack being charged and controls a plurality of connection switches connecting the plurality of external charge sources to the power station to perform charging from the switched second external charge source.

4. The method of claim 1, wherein the charging operation further includes: an operation in which, when at least one of the N battery packs is to be separated from the power station and an amount of charge of the battery pack to be separated is lower than a certain level, the main controller transmits a separation unavailability signal to an output unit, and when the amount of charge is equal to or higher than the certain level, the main controller opens an input relay unit and an output relay unit of the battery pack to be separated, and when the battery pack to be separated is separated, the main controller performs the charge initialization operation to check the charge order.

5. The method of claim 1, wherein the charging operation further includes: an operation in which, when an external battery pack is mounted in the power station, the main controller opens an input relay unit and an output relay unit in a position in which the external battery pack is to be mounted, and when the external battery is mounted, the main controller performs the charge initialization operation to check the charge order.

6. The method of claim 1, wherein the discharging operation further includes: an operation in which, when an external battery pack is mounted in the power station, the main controller opens an input relay unit and an output relay unit in a position in which the external battery pack is to be mounted, and thereafter, when the external battery pack is mounted, the main controller performs the charge initialization operation to check the charge order.

7. The method of claim 1, wherein the power station further includes a sensor unit calculating a remaining amount of electricity and voltage of the N battery packs and transmitting the calculated remaining amount of electricity and voltage to the main controller, wherein the discharging operation further includes: an operation in which when at least one of the N battery packs is lower than a certain voltage level, the main controller opens an output relay unit of a battery pack having a voltage level lower than the certain voltage level, and thereafter, the main controller closes an input relay unit of the battery pack having a voltage level lower than the certain voltage level, and performs the charge initialization operation to check the charge order.

8. A power station for simultaneously perform charging and discharging, the power station comprising: N wherein N is a natural number equal to or smaller than 2, battery packs receiving power from an external charge source and supplying power to a load;

N input relay units connecting the N battery packs to the external charge source; N output relay units connecting the N battery packs to the load; and a main controller controlling the N input relay units and the N output relay units, wherein the main controller performs charging according to a determined order by controlling the N input relay units, and when the load is connected from an outside during a charging operation, the main controller calculates an amount of electricity required by the load and controls the N output relay units to connect battery packs by the number corresponding to the calculated amount of electricity required by the load to the load to perform discharging, wherein when at least one of the N battery packs is to be separated from the power station and a remaining amount of electricity of the other battery packs excluding the battery pack to be separated is less than the amount of electricity required by the load being currently connected, the main controller transmits a load amount excess signal to an output unit, and when the remaining amount of electricity of the other battery packs excluding the battery pack to be separated is equal to or greater than the required amount of electricity, the main controller opens an input relay unit and an output relay unit of the battery pack to be separated.

9. The power station of claim 8, wherein the main controller sets n, wherein n<N for determining a charge order of the N battery packs to 1 so that a first battery pack is connected to the external charge source and charged, and when charging of the first battery pack is completed, the main controller updates n to n=n+1 so that the other battery packs than the first battery pack up to n-th battery pack are sequentially charged.

10. The power station of claim 8, further comprising: a connection switch connecting the external charge source to the N input relay units, wherein the main controller selects one a first external charge source from among plurality of external charge sources.

11. The power station of claim 10, wherein, when the selected first external charge source is switched into a second external charge source, the main controller opens an input relay unit of the n-th battery pack being charged and controls the connection switch so that charging is performed from the second external charge source.

12. The power station of claim 9, wherein, when at least one of the N battery packs is to be separated from the power station and an amount of charge of the battery pack to be separated is lower than a certain level, the main controller transmits a separation unavailability signal to an output unit, and when the amount of charge of the battery pack to be separated is equal to or higher than the certain level, the main controller opens an input relay unit and an output relay unit of the battery pack to be separated.

13. The power station of claim 12, wherein, when the separated battery pack is mounted in the power station, the main controller opens an input relay unit and an output relay unit of the separated battery pack.

14. The power station of claim 8, further comprising: a sensor unit calculating a remaining amount of electricity and voltage of the N battery packs and transmitting the calculated amount of electricity and voltage to the main controller, wherein when at least one of the N battery packs is lower than a certain voltage level, the main controller opens an output relay unit of the battery pack having a voltage level lower than the certain voltage level.

* * * * *